United States Patent [19]
Hwang

[11] Patent Number: 6,121,962
[45] Date of Patent: Sep. 19, 2000

[54] COMPUTER SYSTEM AND METHOD FOR CONTROLLING SCREEN DISPLAY OF A MONITOR IN A POWER MANAGEMENT MODE

[75] Inventor: Hae-Jin Hwang, Suwon, Rep. of Korea

[73] Assignee: SamSung Electronics Co., Ltd., Kyungki-do, Rep. of Korea

[21] Appl. No.: 09/075,318

[22] Filed: May 11, 1998

[30] Foreign Application Priority Data

Jun. 16, 1997 [KR] Rep. of Korea ............... 97-24852

[51] Int. Cl.⁷ .................................................. G09G 65/00
[52] U.S. Cl. ........................ 345/211; 345/204; 713/202; 713/300
[58] Field of Search ........................... 345/204, 211–214, 345/210; 713/202, 300, 324, 323

[56] References Cited

U.S. PATENT DOCUMENTS 5,752,044  5/1998  Crump et al. .................. 395/750.05
5,875,345  2/1999  Naito et al. .................... 395/750.05
5,931,948  8/1999  Morisawa et al. .................. 713/202

*Primary Examiner*—Amare Mengistu
*Assistant Examiner*—Mansour M. Said
*Attorney, Agent, or Firm*—Robert E. Bushnell, Esq.

[57] ABSTRACT

A computer system for controlling a screen display state of a monitor according to input of a password for protecting confidential information from unauthorized users when a computer system is between a standby mode and a suspend mode. The computer system comprises a power controller for converting an operation mode of a computer system into a power management mode which represents one of a power-on mode, a standby mode, a graphic off mode, and a suspend mode according to an access state of the computer system; and a screen controller for converting a screen display state of the display according to a designated one of the power management mode, and controlling the screen display state of the monitor according to input of a password if the computer system is accessed in the graphic off mode.

13 Claims, 5 Drawing Sheets

ABSTRACT6,121,962

COMPUTER SYSTEM AND METHOD FOR CONTROLLING SCREEN DISPLAY OF A MONITOR IN A POWER MANAGEMENT MODE

CLAIM FOR PRIORITY

This application makes reference to, incorporates the same herein, and claims all benefits accruing under 35 U.S.C. §119 from an application for COMPUTER SYSTEM BEING CAPABLE OF CONTROLLING SCREEN DISPLAY STATE AND METHOD THEREOF earlier filed in the Korean Industrial Property Office on the of Jun. 16th 1997, and there duly assigned Ser. No. 24852/1997, a copy of which application is annexed hereto.

BACKGROUND OF THE INVENTION

1. Technical Field

The present invention relates to a computer system for controlling a screen display of a monitor in a power management mode, and more particularly, relates to a computer system for controlling a screen display of a monitor in a power management mode according to input of a password for protecting confidential information from unauthorized users when the computer system is reawakened from a graphic off mode.

2. Related Art

Contemporary computer systems generally consist of a main unit (which may have built-in storage devices such as floppy disks, hard disks and CD-ROM), a keyboard and a monitor. The main unit may be connected to a cathode-ray tube (CRT) monitor and other peripheral devices. In normal usage, it is common for the monitor and other peripherals to be turned on and to remain on for as long as the computer is running, even though the peripherals are actually used only a small percentage of the time. A typical color video monitor, for example, may consume as such as 50 to 80 percent of the total electrical energy consumed by a personal computer (PC). If the monitor consumes valuable energy only to remain idle, not only the valuable energy resources will be wasted but the life of the monitor will decrease rapidly. Obviously, power can be conserved if the user turns the computer system off or in a standby mode each time the computer system is no longer in use for a prolonged period. This requirement is, however, impractical. Therefore, system should be designed to automatically conserve valuable energy resources when the computer system is not in use.

In principle, automatically saving energy by turning off the computer system is fairly easy. Computer systems are invariably designed so that if there is no activity from the keyboard or from other external inputs during a specified time, the computer systems are turned off or placed in a standby mode to save energy. Only minimal logic is kept active to detect when the keyboard or other external inputs are becoming active again so as to turn the computer system back on. Conventional power saving features for typical personal computers having monitors as separate items are disclosed, for example, in U.S. Pat. No. 5,163,124 for Method And Apparatus For Controlling Power To Device In A Computer System issued to Yabe et al., U.S. Pat. No. 5,218,704 for Real Time Power Conservation For Portable Computers issued to Watts, Jr., U.S. Pat. No. 5,375,245 for Apparatus For Automatically Reducing The Power Consumption Of A CRT Computer Monitor issued to Solhjell et al., U.S. Pat. No. 5,389,952 for Low-Power-Consumption Monitor Standby System issued to Kikinis, U.S. Pat. No. 5,408,668 for Method And Apparatus For Controlling The Provision Of Power To Computer Peripherals issued to Tornai, U.S. Pat. No. 5,410,713 for Power Management System For A Computer issued to White, and recently U.S. Pat. No. 5,483,464 for Power Saving Apparatus For Use In Peripheral Equipment Of A Computer issued to Song and assigned to the same assignee of the present invention. Usually, the monitor is shut down during the period of inactivity with the exception of a small amount of power necessary to detect when the computer system becomes active again so as to resume operation of the monitor. Generally, when the monitor is powered normally, the display of data image is blanked during the period of inactivity and re-displayed when the computer system becomes active, i.e., when an input device such as a keyboard is operated. During this type of blanking, however, the monitor continues to consume normal power.

Display power management standards have been set to save power consumption by controlling monitor power with respect to the operational status of the computer system. In the power management mode, power supply is managed according to the operational status of the computer system. The mode status of the power management is classified into power-on, standby, suspend and power-off. First, when the computer system is first turned on, power is continuously supplied to each device of the computer system in a power-on mode. After a period of inactivity, the computer system is switched to a standby mode to reduce power consumption by lowering the operation frequency of a central processing unit (CPU), turning off operation of a monitor, and turning off operation of a hard disk drive (HDD). The computer system may also be temporarily suspended in a suspend mode when there is a sudden power failure or when the computer system is not accessed for a predetermined time period. Lastly, the computer system may be turned off completely in a power-off mode.

During the standby mode, the computer system can be automatically awakened and the mode of the computer system is converted back into the full power-on mode without checking a password when there is an external input such as input from a keyboard, a mouse, and an infrared port, and activity from a hard disk drive (HDD), a floppy disk drive (FDD), a fax/modem card, and a network card. During the suspend mode, the computer system provides a visual display of identification information such as "enter password" on a monitor when the power switch is turned on if the password is set at the time of the computer setup, and the mode of the computer system is converted into the full power-on mode after checking that the input password is correct. The mode of the computer system is converted into the full power-on mode without checking the password if the password is not set at the time of the computer setup.

The mode of the computer system is converted into the full power-on mode after checking the password if the password is set at the time of the computer setup when the power switch is turned on, and the mode of the computer system is converted back into the full power-on mode without checking the password if the password is not set at the time of the computer setup. However, typical computer system, as I have observed, has a disadvantage in that information can not be kept confidential from unauthorized users since the password is not needed, before the computer system is converted into a suspend mode, to convert the computer system back into a full power-on mode.

SUMMARY OF THE INVENTION

Accordingly, it is therefore an object of the present invention to provide a computer system for controlling a screen display of a monitor in a power management mode.

It is also an object to provide a computer system for protecting confidential information from unauthorized users when a monitor is reawaken from a standby mode.

It is another object to provide a computer system for operating in a graphic off mode to turn off a screen display of a monitor for protection against unauthorized users after the monitor is in a standby mode for a predetermined time period.

It is further an object to provide a computer system for requesting input of a correct password while operating in a graphic off mode before returning to a full power-on mode.

These and other objects of the present invention can be achieved by a computer system having a central processing unit, a memory, a system bus and a monitor and comprises a power controller for converting an operation mode of a computer system into a power management mode representing one of a power-on mode, a standby mode, a graphic-off mode, and a suspend mode according to an access state of the computer system; and a screen controller for converting a screen display state of a monitor according to a designated one of the specific power management mode, and for controlling the screen display state of the monitor according to input of a password when the computer system is accessed in the graphic off mode.

According to another aspect of the present invention, a method for controlling a screen display state of a computer system, comprises the steps of: converting the mode of a computer system into a standby mode if power is applied to the computer system and there is no access to the computer system; converting a screen display state of a monitor if there is no access to the computer system for a predetermined time in a standby mode, and converting the mode of the computer system to a graphic off mode in which the screen output state of the monitor is controlled according to input of a password if the computer system is again accessed; and controlling the power supply provided to the computer system according to the operation of a power switch by converting the mode of the computer system into the suspend mode if the computer system is not accessed for the predetermined time in the graphic off mode.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
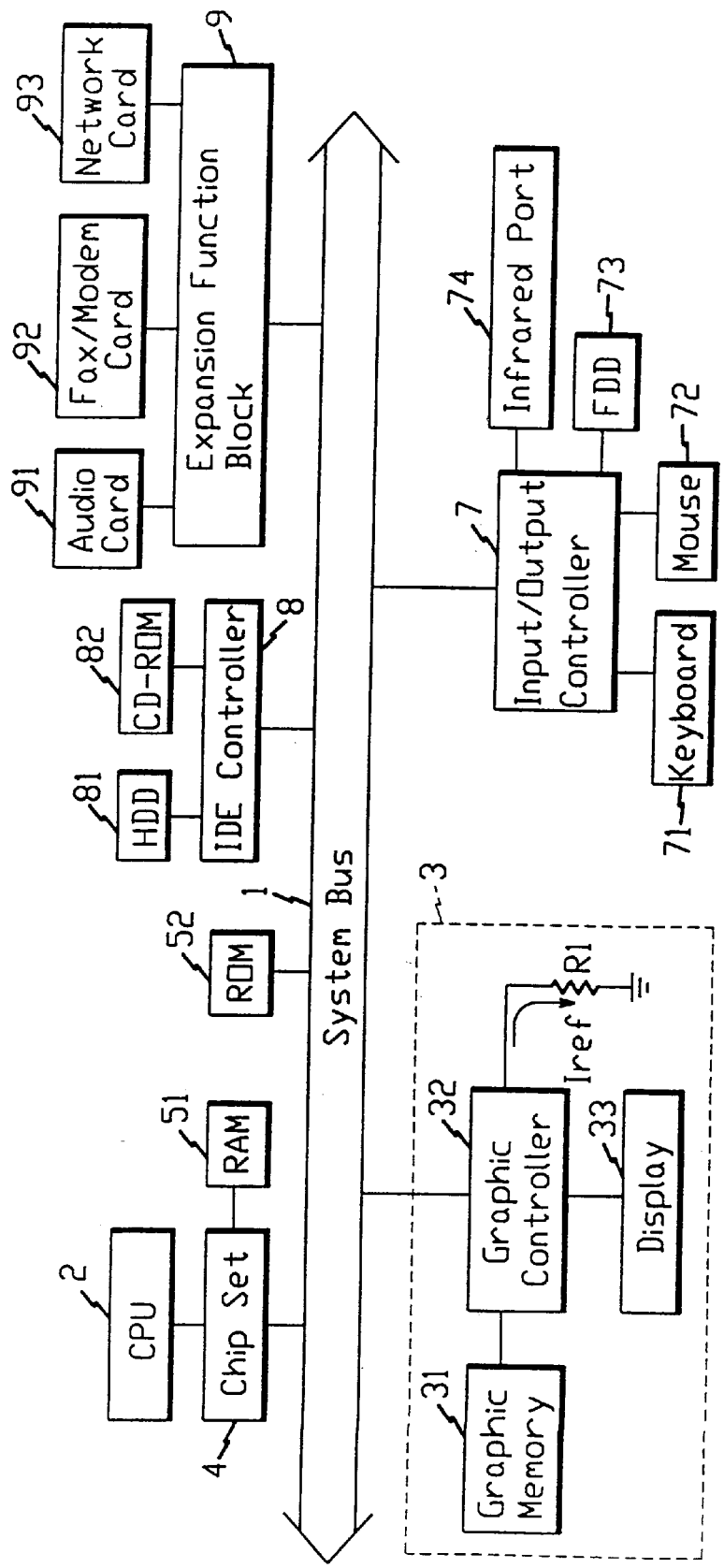
FIG. 1 is a block diagram of a typical computer system for controlling a screen display of a monitor in a power management mode.

Referring now to the drawings and particularly to FIG. 1, which illustrates a computer system for controlling a screen display of a monitor in a power management mode. As shown in FIG. 1, the computer system includes a system bus 1, a central processing unit (CPU) 2, a display device 3 such as a CRT monitor, a chip set 4, an input/output controller 7, an integrated device electronics (IDE) controller 8, an expansion function block 9, a random-access-memory (RAM) 51, a read-only-memory (ROM) 52, a keyboard 71, a mouse 72, a floppy disk drive (FDD) 73, an infrared port 74, a hard disk drive (HDD) 81, a compact disk read-only-memory (CD-ROM) 82, an audio card 91, a fax/modem card 92, and a network card 93.

The system bus 1, is an input/output interface applied to a micro-processor, for connecting data, command, and interrupt in the computer system to each circuit block or each device. The CPU 2 is connected to the system bus 1 for controlling the computer system. The monitor 3 provides visual display of information data on a screen. The chip set 4 is connected to the system bus 1 for converting the mode of the computer system into a specific power management mode by controlling video signals output from the monitor 3, the operation frequency of the CPU 2 and the operation state of the HDD 81 according to the access state to the computer system. The RAM 51 is connected to the chip set 4 and serves as a memory area where the CPU 2 stores a system software and a user software.

The input/output controller 7 is connected to the system bus 1 for controlling the input or output from the keyboard 71, the mouse 72, the infrared port 74 and the FDD 73. The IDE controller 8 is connected to the HDD 81 and the CD-ROM 82 via the system bus 1 for controlling the input or output of the HDD 81 and the CD-ROM 82. The ROM 52 is connected to the system bus 1 and stores specific application programs that are used by the CPU 2. The expansion function block 9 supports the audio card 91, the fax/modem card 92 and the network card 93 for function expansions in the computer system.

The monitor 3 includes a graphic memory 31 for storing data to be displayed on the screen; a graphic controller 32 for reading the data from the graphic memory 31 and converting the data into R,G,B signals; a first resistor R1 having one terminal connected to the graphic controller 32 and the other terminal grounded in order to control the brightness of the R,G,B signals; and a display unit 33 for receiving the R,G,B signals output from the graphic controller 32 and providing a visual display of data information on the screen.

Figure 2:
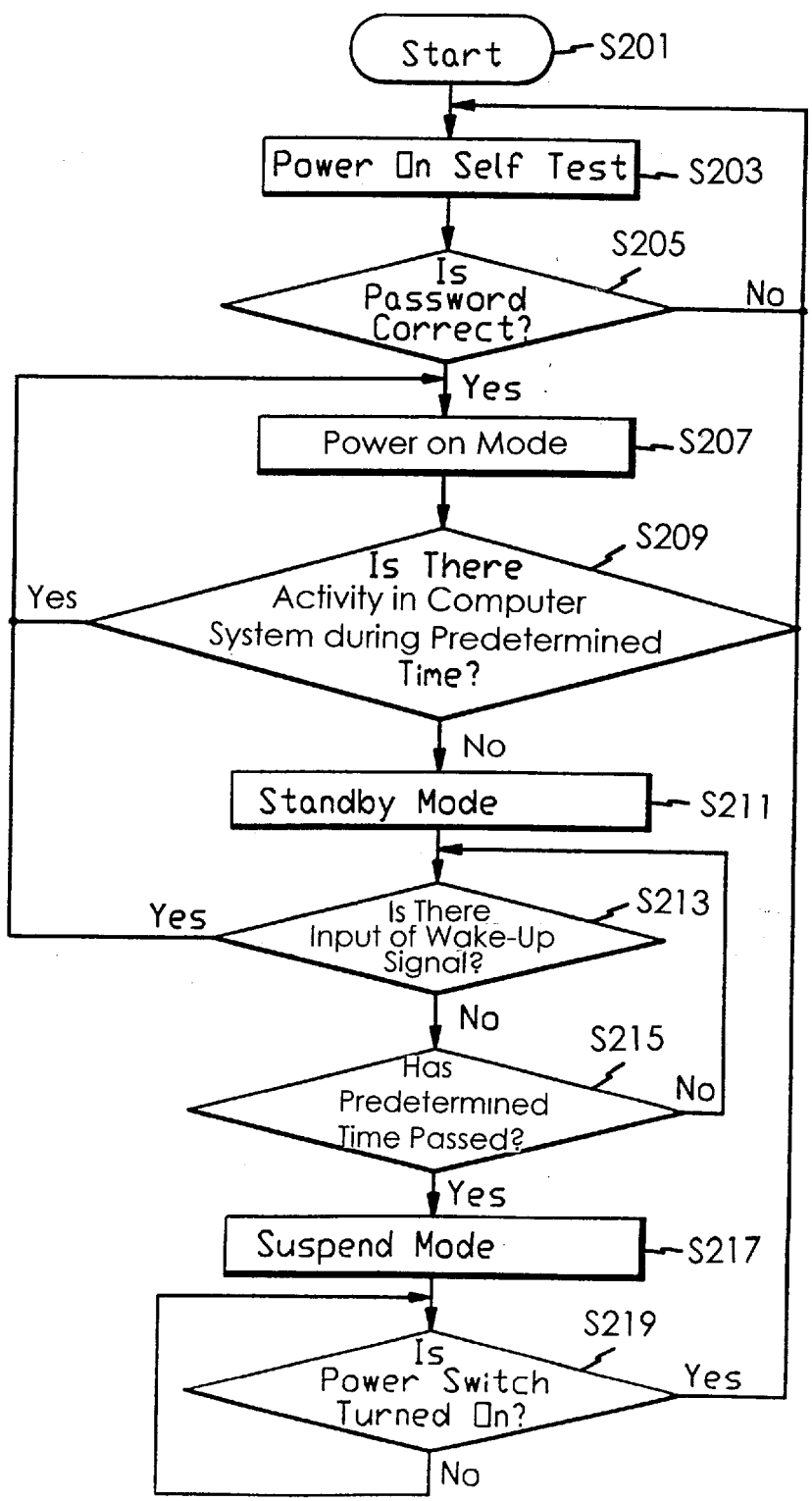
FIG. 2 illustrates a flow chart of a process of controlling a screen display of a monitor in a power management mode.

FIG. 2 illustrates a process of controlling a screen display of the computer system in a power management mode. First, the CPU 2 performs a POST (power on self test) procedure for checking whether the hardware operates normally, using a BIOS boot program when the power switch is turned ON and power is applied to the computer system at steps 201 and 203.

After the POST procedure is completed, the power management mode is set, and the computer system is booted by an operating system. A sentence such as "enter password" is displayed on a screen of the monitor 3 when the power switch is turned ON if the password is set at the time of the computer setup. The booting operation is completed only when the input password is correct, and the user may use the computer system. However, the user can still use the computer system since the booting operation may be completed without checking the password if the password is not set at the time of the computer setup at step 205.

In this situation, the graphic controller 32 of the monitor 3 reads data information to be displayed on the screen from the graphic memory 31, converts the data information into analog R,G,B signals and outputs the R,G,B signals. The display unit 33 receives the R,G,B signals and displays the letters or the image information on the screen if the user uses the computer system through input of the keyboard 71, the mouse 72, the infrared port 74, the access of the FDD 73, the access of the HDD 81, the access of the compact disk ROM 82, the access of the fax/modem card 92 or the access of the network card 93. Reference current Iref determines the brightness of the R,G,B signals from the graphic controller 32, and the reference current Iref is determined by the first resistor R1.

After the POST procedure is completed, the power management mode converts to the full power-on mode at step 207. The chip set 4 next converts the mode of the computer system into a standby mode by lowering the operation frequency of the CPU 2, turning OFF the R,G,B signals output from the graphic controller 32, and turning OFF the HDD 81 at step 211 if there is no input from any one of the keyboard 71, the mouse 72, the infrared port 74 via the input/output controller 7, access of the FDD 73 via the input/output controller 7, access of the HDD 81 and the CD-ROM 82 via the IDE controller 8, access of the fax/modem card 92 and the network card 93 via the expansion function block 9 for a predetermined time set for converting the full on mode into the standby mode at step 209.

The chip set 4 converts the mode of the computer system into the full power-on mode if there is input of a wake-up signal from the input/output controller 7, the IDE controller 8 and the expansion function block 9 to the CPU 2 from the keyboard 71, the input from the mouse 72, the input from the infrared port 74, the access of the FDD 73, the access of the HDD 81, the access of the CD-ROM 82, the access of the fax/modem card 92 or the access of the network card 93 at step 213. If there is no input of a wake-up signal from either the keyboard 71, the mouse 72, or the infrared port 74, access of the FDD 73, access of the HDD 81, access of the CD-ROM 82, access of the fax/modem card 92 or access of the network card 93 at step 213, the chip set 4 checks the time when the computer system operates in the standby mode and determines whether a predetermined time has passed at step 215.

When a predetermined time has passed and there is no input of a wake-up signal, the mode of the computer system is converted into a suspend mode from a standby mode at step 217. The chip set 4 senses the state of the power switch if the mode of the computer system is converted into the suspend mode. The process routine jumps to the step for performing the POST procedure if the power switch is turned ON, whereby the computer system is booted again. If the power switch is not turned ON, the power OFF state is maintained at step 219.

As I have observed however, the typical computer system has a disadvantage in that data information can not be kept confidential from unauthorized users since a password is not needed, before a computer system is converted into a suspend mode, to convert a computer system into a full power-on mode.

Figure 3:
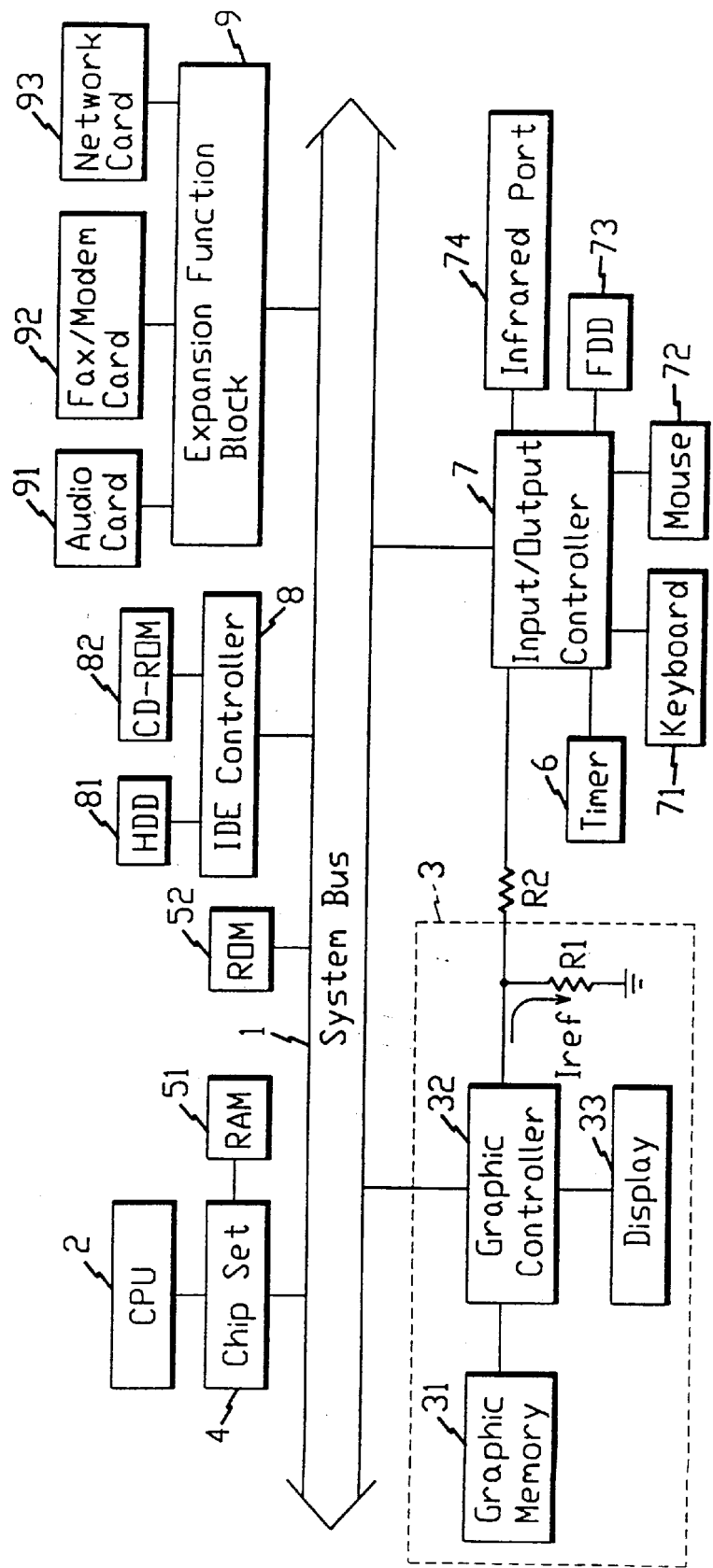
FIG. 3 is a block diagram of a computer system for controlling a screen display of a monitor in a power management mode according to the principles of the present invention.

Turning now to FIG. 3, FIG. 3 which illustrates a computer system for controlling a screen display of a monitor in a power management mode according to the principles of the present invention. The computer system includes a system bus 1, a central processing unit (CPU) 2, a display device 3 such as a CRT monitor, a chip set 4, a timer 6, an input/output controller 7, an integrated device electronics (IDE) controller 8, an expansion function block 9, a random-access-memory (RAM) 51, a read-only-memory (ROM) 52, a keyboard 71, a mouse 72, a floppy disk drive (FDD) 73, an infrared port 74, a hard disk drive (HDD) 81, a compact disk read-only-memory (CD-ROM) 82, an audio card 91, a fax/modem card 92, and a network card 93.

The monitor or display 3 includes a graphic memory 31, a graphic controller 32, a first resistor R1 and a display unit 33. The chip set 4 is connected to the system bus 1 for converting the mode of a computer system into a power management mode according to the operation state of the computer system by controlling R,G,B signals from the display 3, operation frequency of the CPU 2 and the operation of the HDD 81. The timer 6 is connected to the input/output controller 7 for measuring a standby mode operation time if the computer system operates in a standby mode for a predetermined time, and outputting a graphic off signal. The input/output controller 7 is, in turn, connected to the system bus 1 for converting the mode of the computer system into a graphic off mode by outputting a graphic cut-off signal if the graphic off signal is input from the timer 6, checking a password if there is an input signal from a keyboard 71, a mouse 72 or an infrared port 74, and converting the mode of the computer system into a mode in which the user can see a screen of display unit 33; of the display or monitor 3 by stopping the output of the graphic cut-off signal if the password is correct. The second resistor R2 has one terminal connected to a node between the first resistor R1 in the display 3 and the graphic controller 32, and the other terminal connected as the input/output controller 7.

The system bus 1, the CPU 2, the display 3, the RAM 51, the ROM 52, the IDE controller 8 and the expansion function block 9 of the present invention have the same function as the typical computer system as shown in FIG. 1.

Figure 4A:
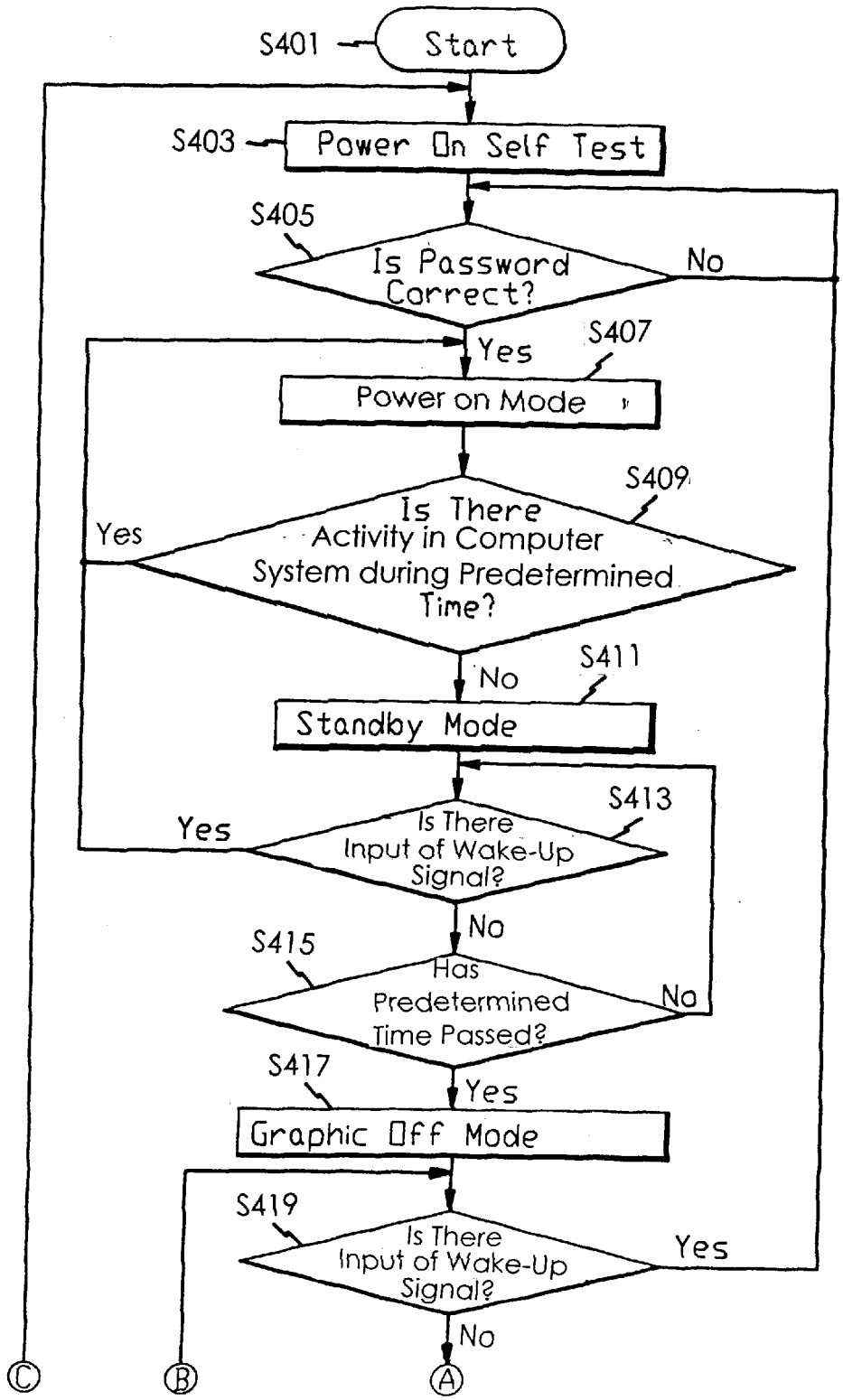
FIGS. 4A and 4B illustrate a flow chart of a process of controlling a screen display of a monitor in a power management mode according to the principles of the present invention.
Figure 4B:
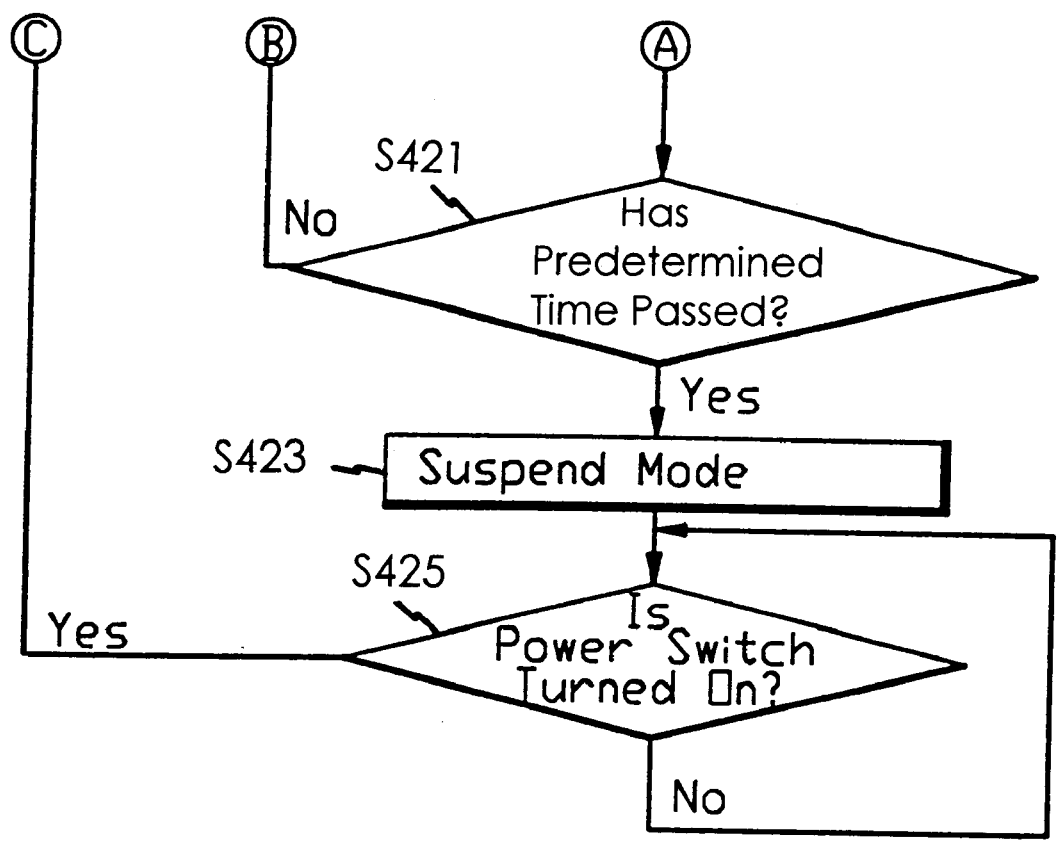

Now, the operation of the computer system for controlling a screen display state according to the preferred embodiment of the present invention will be described in detail with reference to FIGS. 3 and 4A–4B hereinbelow.

First, the CPU 2 performs a POST (power on self test) procedure for checking whether the hardware operates normally, using a BIOS boot program when the power switch is turned ON and power is applied to the computer system at steps 401 and 403.

After the POST procedure is completed, the power management mode is set, and the computer system is booted by an operating system. A sentence such as "enter password" is displayed on a screen of the monitor 3 when the power switch is turned ON if the password is set at the time of the computer setup. The booting operation is completed only when the input password is correct, and the user may use the computer system. However, the user can still use the computer system since the booting operation may be completed without checking the password if the password is not set at the time of the computer setup at step 405.

Here, the graphic controller 32 in the monitor 3 reads information data to be displayed on the screen from the graphic memory 31, converts the information data into analog R,G,B signals and outputs the R,G,B signals to the display or display unit 33 if the user uses the computer system through the keyboard 71, the mouse 72, the infrared port 74, the access of the FDD 73, the access of the HDD 81, the access of the CD-ROM 82, the access of the fax/modem card 92 or the access of the network card 93. The display unit 33 receives the R,G,B signals and displays the letters or the image information on the screen of display unit 33.

Reference current Iref determines the brightness of the R,G,B signals from the graphic controller 32, and the reference current Iref is determined by the first resistor R1. The greater the first resistor R1, the lesser the reference current Iref, whereby the screen becomes dark. Generally, the value of the reference current Iref is about 3.05 mA since voltage value of the R,G,B signals from the graphic controller 32 is about 1.1V and the first resistor has a resistance value of 360 Ohm. The power management mode converts to the full power-on mode in which power is normally supplied to each part of the computer system if the computer system is used as described at step 407.

The chip set 4 converts the mode of the computer system into the standby mode by lowering the operation frequency of the CPU 2, turning OFF the R,G,B signals from the graphic controller 32, and turning OFF the HDD 82 at step 411 if there is no input from any one of the keyboard 71, the mouse 72, and the infrared port 74 via the input/output controller 7, access of the FDD 73 via the input/output controller 7, access of the HDD 81 and the CD-ROM 82 via the IDE controller 8, access of the fax/modem card 92 and the network card 93 via the expansion function block 9 for a predetermined time set for converting the full power-on mode into the standby mode at step 409.

The R,G,B signals are turned OFF if the chip set 4 sets an R,G,B output registered in the graphic controller 32 to an OFF state, and the R,G,B signals are turned ON if the chip set 4 sets the R,G,B output register to an ON state, whereby the R,G,B signals are output to the display unit 33 for a visual display.

The timer 6 starts operating if the mode of the computer system is converted into the standby mode. The timer 6 measures the standby operation time if the computer system operates in the standby mode for a predetermined time, and outputs the graphic off signal to the input/output controller 7. If there is input of a wake-up signal from the input/output controller 7, the IDE controller 8 and the expansion function block 9 to the CPU 2 by any one of the keyboard 71, the mouse 72, the infrared port 74, the FDD 73, the HDD 81, the CD-ROM 82, the fax/modem card 92 or the network card 93 at step 413, the chip set 4 senses the wake-up signal and converts the mode of the computer system into the full power-on mode.

However, the input/output controller 7 receives the graphic off signal and outputs the graphic cut-off signal if there is no input by the keyboard 71, input by the mouse 72, input by the infrared port 74, access of the FDD 73, access of the HDD 81, access of the compact disk ROM 82, access of the fax/modem card 92 or access of the network card 93 at step 413, and the graphic off signal is outputted from the timer 6 at step 415.

The graphic cut-off signal outputted from the input/output controller 7 is applied to the first resistor R1 in the display 3. Here, the graphic cut-off signal has the higher voltage than the voltage of the R,G,B signals outputted from the graphic controller 32, and prevents the reference current Iref from flowing. Accordingly, the R,G,B signals outputted from the graphic controller 32 are not output to the display unit 33, whereby the user can not see the screen, that is, the mode of the computer system becomes the graphic off mode. The second resistor R2 is for protecting the graphic controller 32 from the graphic cut-off signal.

The chip set 4 restores the operation frequency of the CPU 2 to the normal state, turns ON the R,G,B signals output from the graphic controller 32 by setting the R,G,B output register to an ON state, and turns ON the HDD 81 if there is a signal input to the CPU 2 from the input/output controller 7, the IDE controller 8 and the expansion function block 9 by the input by the keyboard 71, input by the mouse 72, input by the infrared port 74, access of the FDD 73, access of the HDD 81, access of the compact disk ROM 82, access of the fax/modem card 92 or access of the network card 93 at step 419.

However, the computer system maintains the graphic off mode in which any letters or image information is not displayed on the screen of the display unit 33 since the R,G,B signals output from the graphic controller 32 are not continually input to the display unit 33 owing to the graphic cut-off signal output from the input/output controller 7.

The user enters the password in the graphic off mode in which any letters or image information is not displayed on the screen of the display unit 33 of display or monitor 3. The input/output controller 7 stops outputting the graphic cut-off signal and directs the R,G,B signals from the graphic controller 32 to the display unit 33 for a visual display so that the user may see the screen, and the mode of the computer system is converted into the full power-on mode if the input password is correct after the input/output controller 7 checks the password input by the user in the graphic off mode. However, the input/output controller 7 outputs the graphic cut-off signal continually so that the user can not see the screen if the correct password is not input, and maintains the graphic off mode in which the R,G,B signals from the graphic controller 32 can not be input to the display unit 33.

The chip set 4 converts the mode of the computer system into the mode in which the power to the CPU 2, the display 3, the FDD 73, the HDD 81 and the other sub-systems are turned OFF at step 423 if there is no signal inputted to the CPU 2 from the input/output controller 7, the IDE controller 8 and the expansion function block 9 by the input by the keyboard 71, input by the mouse input by the infrared port 74, access of the FDD 73, access of the HDD 81, access of the compact disk ROM 82, access of the fax/modem card 92 or access of the network card 93 for a predetermined time set for the suspend mode in the graphic mode at step 421.

The chip set 4 senses the state of the power switch if the mode of the computer system converts to the suspend mode. A process routine jumps to the step for performing the POST procedure if the power switch is turned ON, and the computer system is booted again. The chip set 4 maintains the power OFF state if the power switch is not turned ON at step 425.

The present invention relates to an executive routine when suspend information is stored in an auxiliary memory. When the suspend information is stored in a main memory, steps can be added to determine whether there is access to the CPU for the predetermined time after step 425 and to turn OFF the power. In addition, the timer of the present invention and its equivalent measures the standby operation time if the computer system operates in the standby mode for a predetermined time and outputs the graphic off signal.

As described above, the computer system of the present invention has an advantage in that information is kept confidential by adding the graphic off mode between the standby mode and the suspend mode when the computer system operates in the standby mode for the predetermined time. In addition, information can be secured since a password is checked in the graphic off mode in which the letters or the image information may not be displayed.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A computer system for controlling a display, the computer system having a central processing unit, a memory, a system bus and a display, comprising:

a power controller for converting an operation mode of the computer system into a power management mode, said power management mode representing one of a power-on mode, a standby mode, a graphic off mode, and a suspend mode according to an access state of the computer system, said power controller for converting the computer system into said standby mode when power is applied to the computer system and there is no access to the computer system, for converting the computer system to said graphic off mode in which a screen-display state of said display is controlled according to input of a password, and for converting the computer system into said suspend mode when the computer system is not accessed for a predetermined time during said graphic off mode; and a screen controller for converting the screen display state of said display according to a designated said power management mode, and said screen controller for controlling the screen display state of said display according to input of a password when the computer system is accessed in said graphic off mode, the computer system checking an input password when entered by a user in said graphic off mode and, when the input password entered in said graphic off mode is a correct password, the computer system by said screen controller then controlling the screen display state to permit a visual display on said display.

2. The computer system of claim 1, further comprising a timer for measuring a standby operation time when the computer system operates in said standby mode for a predetermined time, and said timer generating when said predetermined time in said standby mode has passed a graphic off signal to said screen controller to enter said graphic off mode.

3. The computer system of claim 2, further comprised of said screen controller controlling the screen display state of said display by the graphic off signal input from said timer, and said screen controller controlling the screen display state of said display by a graphic cut-off signal according to the input password.

4. A method for controlling a screen display state of a computer system, comprising the steps of:

converting the computer system into a standby mode when power is applied to the computer system and there is no access to the computer system;

converting the screen display state of a display when there is no access to the computer system for a predetermined time during said standby mode, and converting the computer system to a graphic off mode in which the screen display state of said display is controlled according to input of a password when the computer system in said graphic off mode is again accessed;

checking by the computer system an input password when entered by a user in said graphic off mode and controlling the screen display state by the computer system to permit a visual display on said display when the input password entered in said graphic off mode is a correct password; and converting the computer system into a suspend mode when the computer system is not accessed for a predetermined time during said graphic off mode.

5. The method of claim 4, further comprised of the screen display state of the display being controlled by a graphic cut-off signal output from an input/output controller to a graphic controller.

6. A method for controlling power supply to a computer system having a computer, a monitor and input devices, said method comprising the steps of:

initializing said computer system upon activation of power;

requesting entry of a password when the password is set at the time of a computer setup;

when the password is entered correctly, supplying power to the computer system for use in a power-on mode of operation;

determining whether there is activity from input devices indicating that the computer system is in use for a first time period;

when there is activity from the input devices indicating that the computer system is in use during the first time period, maintaining the power supply to the computer system;

when there is no activity from the input devices indicating that the computer system is not in use during the first time period, converting the computer system into a standby mode of operation;

determining whether there is further activity from the input devices for a second time period;

when there is activity from the input devices during the second time period, resupplying power back to the computer system and maintaining the power supply to the computer system for use;

when there is no further activity from the input devices during the second time period, converting the computer system into a graphic-off mode of operation shutting off a visual display on the monitor;

determining whether there is yet activity from the input devices for a third time period;

when there is activity from the input devices during the third time period, requesting entry of said password before resupplying power back to the computer system for use in the power-on mode;

when there is no activity from the input devices during the third time period, converting the computer system in a suspend mode of operation.

7. The method of claim 6, further comprised of supplying power to the computer system for use in said power-on mode of operation without requesting entry of said password when the password is not set at the time of the computer setup.

8. A computer system, comprising:

a main computer containing a controller and auxiliary devices;

a monitor physically separated from but electrically connected to said main computer;

input devices connected to said main computer; and said controller controlling power supply and a screen display state of said monitor by the steps of:

initializing said computer system upon activation of power;

requesting entry of a password when the password is set at the time of a computer setup;

when the password is entered correctly, supplying power to the computer system for use in a power-on mode of operation;

determining whether there is activity from input devices indicating that the computer system is in use during a first time period;

when there is no activity from the input devices indicating that the computer system is not in use during the first time period, converting the computer system into a standby mode of operation;

determining whether there is further activity from the input devices for a second time period;

when there is no further activity from the input devices during the second time period, converting the computer system into a graphic-off mode of operation shutting off a visual display on the monitor;

determining whether there is yet activity from the input devices for a third time period;

when there is activity from the input devices during the third time period, requesting entry of said password before resupplying power back to the computer system for use in the power-on mode;

when there is no activity from the input devices during the third time period, converting the computer system in a suspend mode of operation.

9. The computer system of claim 8, further comprised of said controller supplying power to the computer system for use in said power-on mode of operation without requesting entry of said password when the password is not set at the time of the computer setup.

10. The computer system of claim 8, further comprised of said controller maintaining the power supply to the computer system, when there is activity from the input devices indicating that the computer system is in use during the first time period.

11. The computer system of claim 8, further comprised of said controller resupplying power back to the computer system and maintaining the power supply to the computer system for use, when there is activity from the input devices during the second time period.

12. The computer system of claim 10, further comprised of said controller resupplying power back to the computer system and maintaining the power supply to the computer system for use, when there is activity from the input devices during the second time period.

13. The computer system of claim 9, further comprised of said controller maintaining the power supply to the computer system, when there is activity from the input devices indicating that the computer system is in use during one of the first time period and the second time period.

* * * * *